United States Patent [19]

Maier

[11] Patent Number: 4,574,328
[45] Date of Patent: Mar. 4, 1986

[54] SENSOR FOR CAPACITIVELY MEASURING THE LEVEL OF MATERIAL IN A CONTAINER

[75] Inventor: Winfried Maier, Maulburg, Fed. Rep. of Germany

[73] Assignee: Endress u. Hauser GmbH u. Co., Maulburg, Fed. Rep. of Germany

[21] Appl. No.: 592,332

[22] Filed: Jun. 6, 1983

[30] Foreign Application Priority Data

Jun. 4, 1982 [DE] Fed. Rep. of Germany ... 8216324[U]

[51] Int. Cl.[4] .......................... G01F 23/26; H01G 5/28
[52] U.S. Cl. .................................... 361/284; 73/304 C
[58] Field of Search .............. 73/304 C; 361/280, 282, 361/283, 284

[56] References Cited

U.S. PATENT DOCUMENTS

| 2,699,523 | 1/1955 | Meyers | 73/304 C |
| 3,500,687 | 3/1970 | Smith | 73/295 |
| 3,901,079 | 8/1975 | Vogel | 73/304 C |

FOREIGN PATENT DOCUMENTS 446761 10/1974 U.S.S.R. ............................ 73/304 C

Primary Examiner—Donald A. Griffin
Attorney, Agent, or Firm—Murray, Whisenhunt & Ferguson

[57] ABSTRACT

A sensor for capacitively measuring the level of material in a container where the sensor extends through an opening in the container and is connected to measuring circuitry. The sensor includes an electrically conductive, tubular member aligned with the opening. An elongated electrically conductive member is in electrical contact with the circuitry and projects through the container opening and the tubular member such that a space is established between the elongated conductive member and the tubular member so that they are electrically insulated from one another. The space is sealed to prevent entry of moisture therein.

13 Claims, 2 Drawing Figures

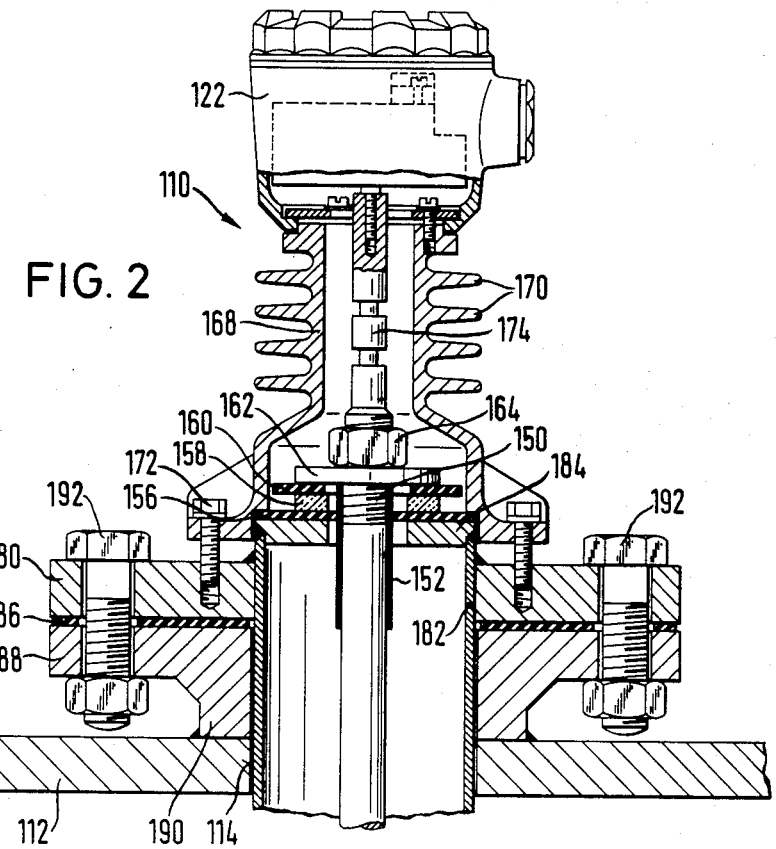
FIG. 2
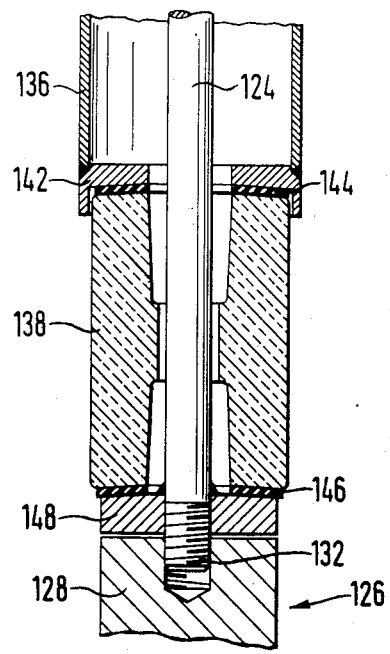

SENSOR FOR CAPACITIVELY MEASURING THE LEVEL OF MATERIAL IN A CONTAINER

BACKGROUND OF THE INVENTION

This invention pertains to a sensor for the capacitive measurement of the level of material in a container where the material may be at a very high temperature. This is effected by means of a special sensor introduced via an opening in the container's wall, the sensor being pressure tight and electrically insulated.

The capacitive measurement is based, as is known, on the capacity between the sensor electrode and an opposing electrode which is usually formed by the metallic container wall which capacity is variable in respect to the level of material. Capacitive sensors can be used for continuous level measurements or to determine limiting conditions. In every case special demands are made of the sensors when the contents to be measured are in a heated condition. Examples of such contents are hot minerals and flue dust. Hot minerals are ground rock which is heated in rotary rod ovens to temperatures of up to 400° C. and are used in the manufacture of road tops. Hot flue dust is obtained, for example, in coal powered electric power stations and attains the same temperatures. The sensors that are used to measure hot material such as these must be resistant to heat, pressure and abrasion. Beyond that, exists the problem of false measurement caused by moisture which collects at places where the probes are led into the container.

Despite the hot temperature that obtains inside the container, it is possible for condensate to form along the relatively cool container walls. This causes moisture to collect at the place where the sensor passes through the container wall and produces a false reading.

SUMMARY OF THE INVENTION

The purpose of this invention is to create a capacitive sensor which is especially suited for the measurement of hot material and which is protected against moisture collection and prevents the introduction of moisture into the sensor's interior.

This is achieved in this invention in that the sensor's electrode beginning at the lead-in place and continuing for a part of its length is surrounded by a metallic moisture proof tube which projects into the interior of the container. This tube is electrically insulated from the sensor's electrode and the inner chamber of the moisture proof tube is sealed off from the moisture.

The moisture proof tube has the function of allowing the sensor's electrode to enter the container's interior at a place that is sufficiently removed from the container's wall where the temperature of the material already obtains so that no condensation will any longer occur. The required length of the moisture proof tube depends on the operational conditions; especially the temperature of the material and the anticipated condensate formation. Basically, the longer the length of the moisture proof tube, the better it is. Experience has shown that the moisture proof tube should extend at least 300 mm freely into the interior of the container. 400 mm has proven to be a useful standard length; however, depending on the specific application it is possible to select an even greater length. A condensate that might form on the outside of the moisture proof tube which could result in a moisture accumulation, has no effect on the capacity between the sensor's electrode and the container wall since the metallic moisture proof tube is at the electrical potential of the container wall. The level measurement is thus not affected by the condensate and the accumulations. Furthermore, the design is such as to prevent the introduction of moisture into the interior of the probe.

A special advantageous design version of the invented probe calls for the probe's electrode to consist of two parts. One is a metal bar surrounded by a moisture proof tube which is permanently joined to a mounting piece that supports the probe's electrode. The other is the actual active probe electrode which is connected to the end of the metal bar that protrudes from the moisture proof tube. This allows the probe to be used under different operational conditions and different container materials by simply exchanging the active probe electrode. It will not be necessary to change the other parts of the probe.

When the probe has a head that is mounted onto a part outside of the container and when it makes use of an electronic circuit that connects to the probe electrode, then we encounter an additional problem; namely that the electronics located in the probe's head will be endangered by the heat which is passed from the container to the probe's head. This problem is especially troublesome when the mounting piece is in heat-transfer contact with the moisture proof tube since under this circumstance a considerable amount of additional heat is carried to the mounting piece via the moisture proof tube. A special advantageous design version of this invention solves this problem. Attached to the mounting piece is a tubular shaped cooling device provided with cooling ribs (vanes) which carries the probe's head and which passes through the connecting conductor between the probe electrode and the electronic circuitry. This cooling device conducts a major part of the heat transmitted by the mounting device to the outside so that it cannot reach the electronics located in the head of the probe.

Other objects and advantages of this invention will be apparent from a reading of the following specification and claims taken with the drawing.

BRIEF DESCRIPTION OF THE DRAWING

FIG. 2 is a partial cut view of a second illustrative embodiment of a capacitive probe according to the invention.

DETAILED DESCRIPTION OF PREFERRED EMBODIMENTS OF THE INVENTION

Figure 1:
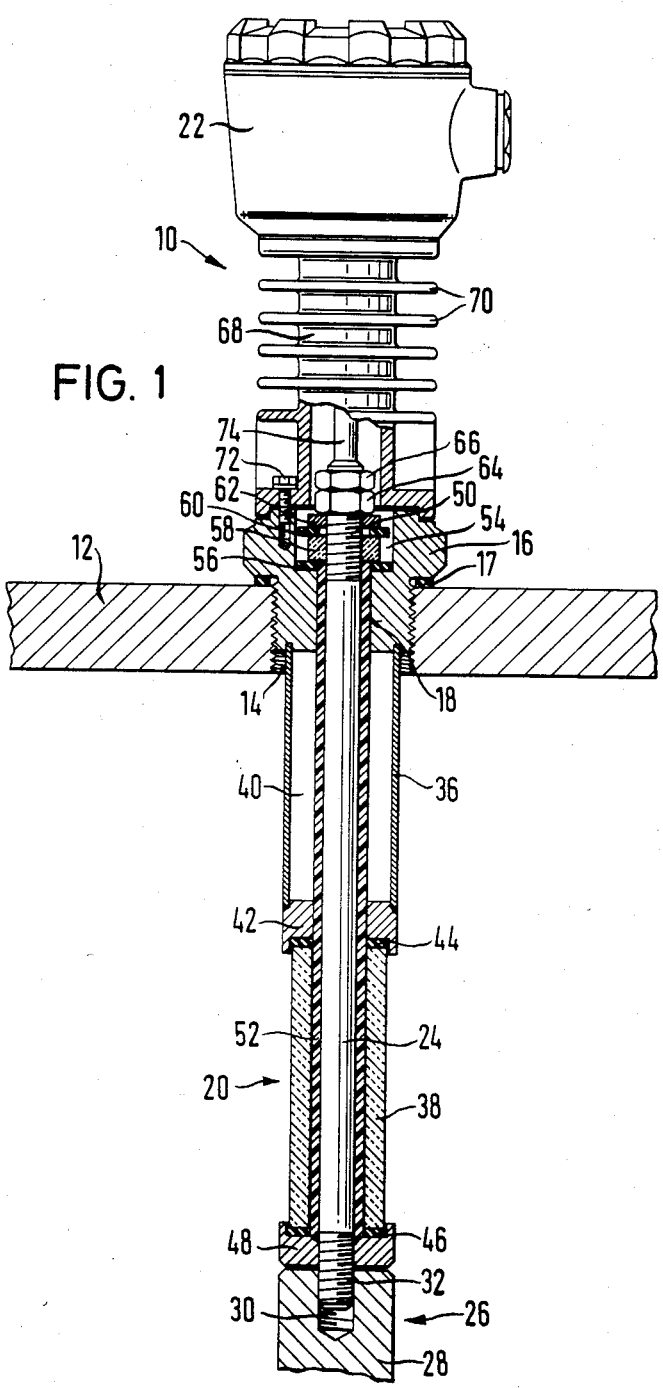
FIG. 1 is a partial cut view of a first illustrative embodiment of a capacitive probe according to the invention.

The capacitive probe 10 shown in FIG. 1 serves to measure the contents of a container whose upper wall 12 only is shown. This container wall 12 is provided with an opening 14 with an inner thread into which is fastened the probe 10 by means of a screwed part 16 that has an external thread. A seal 17 is provided. The measurement of the level of material is performed by a sensor electrode 20 which is electrically insulated and which is pressure-tight. This electrode is led through a central opening 18 in the screwed part 16 and which extends downward into the container. Depending on the amount of material in the container, the sensor electrode 20 will be more or less covered by the material so that the capacity between the sensor electrode 20 and a counter electrode which most often is the metallic container wall, is variable depending on the amount of volume. Changes in the capacity are picked up by an electronic circuit which is lodged outside of the container in a sensor-head 22. The measuring signals that are supplied by this circuit are used to indicate the level of material in the container.

The sensor electrode 20 consists, in the illustrated example, of two parts: that is of a metal bar 24 which is electrically insulated and is led pressure tight through the screwed piece 16, and the actual active sensor electrode 26 which is connected to the lower end of the metal bar 24. For this purpose, the upper end of the active sensor electrode 26 is shaped as a threaded head 28 which is provided with a bore 30 in its inner thread which is screwed on to a threaded section 32 at the lower end of the bar 24.

This two section design of the sensor electrode 20 makes it possible to adapt the capacitive sensor to very different operational conditions by merely changing the active sensor electrode 26 without changing the other parts of the sensor. The type and shape of the active sensor electrode 26 depends especially on whether the capacitive sensor is used for the continuous measuring of the contents or whether limiting levels inside the container are being measured. For use as a continuous level measure, the active sensor electrode 26 must have a large length so that it extends over the entire height of the container. In this case, the active sensor electrode consists, usually of a sensor rope which is lodged inside the threaded head 28 and which is put under load by means of a sensor weight located at the lower end. In order to measure a limiting level the active sensor electrode 26 can have a relatively short length. For example, it can be formed by a flat or tubular metal part located at the threaded head 28. The sensor 10 can, in that case, be attached horizontally, at about the height of the expected material level, along the side wall of the container.

The design of the active sensor electrode 26 can also vary depending on the nature of the material that is to be measured. Since these different forms of electrodes are known, there is no need to describe these here.

The designed capacity sensor shown in FIG. 1, is especially suited for measuring the level of very hot material such as hot minerals, flue dust or similar agents. Example of hot minerals are crushed rock which is heated in rotary rod ovens to temperatures of up to 400° C. and which is used in road construction. Hot flue dust such as are encountered in coal fed power plants attain similar temperatures. The measurement of the level of hot materials puts special demands on the capacitive sensor especially in respect to mechanical strength and heat resistance. Above and beyond, the problem of false measurements is encountered as results of moisture accumulations at the place where the sensor electrode is passed through.

Despite the high temperatures that occur in the interior of the container a condensate can form along the relatively cold container walls. The design depicted in FIG. 1 results in a sensor that is impervious against moisture accumulation and which prevents the introduction of moisture into the interior of the sensor.

For this purpose, that part of the sensor electrode 20 which protrudes into the interior of the container is covered—from the lead-in spot and for a considerable length—by a moisture resistant tube which preferably is formed by a metal tube 36 made of steel. In the design version shown, the metal tube 36 envelops a considerable portion of the metal bar 24. The metal tube 36 is joined by a ceramic tube 38 which envelops the rest of the metal bar 24 with the exception of the threaded section 32. The metal tube 36 is welded coaxially to the center hole 18 along the lower face of the screw part 16. The inside diameter of the metal tube 36 is considerably larger than the outside diameter of the metal bar 24 so that a circular (ring) shaped space 40 is created between the metal bar 24 and the metal tube 36. At the lower end of the metal tube 36 a metallic locking piece 42 is welded which has a central opening to pass through the metal bar 24. The lower face of the locking piece 42 is provided with a shallow depression which accommodates the upper end of the ceramic tube 38 together with the seal ring 44. The lower end of the ceramic tube 38 rests—together with a seal 46—in a shallow depression at the upper face of an abutment 48 which is threaded onto the threaded section 32 and is, additionally, secured by a welding seam and is pressure tightly joined to the metal bar.

The end of the metal bar 24 which on the upper end passes out of the central opening 18 of the screwed part 16 is also designed as a threaded section 50. The part of the metal bar 24 that rests between the two threaded sections 32 and 50 is—over its entire length—covered by a jacket 52 consisting of an electrically insulated material which can be, for example, a tube of heat resistant synthetic material such as polytetrafluorethylene. This insulating material 52 electrically insulates the metal bar 24 in respect to the screw piece 16 and the locking piece 42.

In the upper part of the screwed piece 16, which is designed as a hexagon head, is provided a cut out 54 which has a considerably larger diameter than the central opening 18. The threaded section 50 which protrudes through this cut out 54 is surrounded by a stack consisting of a seal ring 56, a ceramic disk 58, another sealing ring 60 and a metal disk 62. Along the metal disk 62 is a nut 64 which is screwed to the threaded section 50 and which is secured by a lock nut 66.

By tightening the nut 64, on the one hand, the cermaic tube 38 is locked between the locking piece 42 and the abutment 48 (by pressing together the seals 44 and 46). On the other hand, the stack 56, 58, 60, 62 is pressed against the bottom of the cut out 54. In this fashion, all parts are tightly connected with the screwed part 16. The sensor electrode 20 is electrically insulated by the ceramic tube 38, the insulating material 52 and the ceramic disk 58 from the screwed piece 16 and the metal tube 36 which are electrically connected with the container wall 12. By means of the seals 44 and 46, the inner chamber of the moisture resistant tube 36 is sealed off against the invasion of moisture.

The moisture resistant tube 36 has the function of allowing the sensor electrode 20 to enter the container at a place that is sufficiently distant from the container wall 20 to assure a temperature region which does not allow for any condensation. The requisite length of the moisture resistant tube depends on the operational conditions; especially on the temperature of the container material and on the expected condensate formation. Basically, the longer the length of the moisture resistant tube, the better it is. The length of the moisture resistant tube is however, limited by other factors; especially, of course, the moisture resistant tube—in cases of vertical insertion—must end at the highest expected material level.

Experience has shown that the moisture resistant tube 36 should extend freely for at least 300 mm into the interior of the container. A standard length of 400 mm has been shown to be desirable; however, depending on the operational conditions a longer length may be needed. A condensation forming along the outside of the moisture resistant tube 36 and a resulting moisture accumulation has no influence on the capacity between the sensor electrode 20 and the container wall as the metal moisture resistant tube 36 is electrically connected (conducting) to the container wall 12 via the screwed piece 16 and thus rests on the potential (electrical) of the container wall. Thus, the level measurement is not affected by the condensate or the accumulation.

The length of the ceramic tube 38 is designed to assure a sufficient insulation gap between the active sensor electrode 26 that extends freely into the container and the moisture resistant tube 36. Experience has shown that a length of about 100 mm is sufficient for this purpose.

In the capacitive sensor electrode shown in FIG. 1, special design features were provided to protect the electronics located in the head of the sensor 22 from the heat obtaining in the interior of the container. For this purpose, the sensor head is mounted at the top end of a tubular radiator 68 which is provided on the outside with cooling ribs 70. The tubular radiator 68 is attached to the upper side of the screwed piece 16 by means of screws 72. An extension 74 of the metal bar 24 which passes through the hollow interior of the radiator 68, connects the sensor electrode with the electronics placed within the interior of the sensor head 22. The radiator 68 passes off a major share of the heat that is transmitted via the moisture resistant tube 36 and the screwed piece 16 to the outside. Preferably, the radiator 68 is made of cast aluminum.

The design version of the capacitive sensor depicted in FIG. 2 differs from the design in FIG. 1 essentially only in respect to the mounting used along the container wall. Since the other components are basically the same in respect to design and function as in FIG. 1, the same reference numbers plus 100 are used.

The capacitive sensor 110 in FIG. 2 rests in the opening 114 of a container/wall 112 and it has a metal bar 124 whose lower end is fashioned as a threaded section 132 which is used to mount the threaded head 128 of the active sensor electrode 126. The metal bar 124 is surrounded for much of its length by a moisture resistant tube 136 made of metal which is joined by a ceramic tube 138 which, with the aid of seals 144 and 146, is pressed between the locking piece 142 located at the lower end of the moisture resistant tube 136 and an abutment 148 located at the lower end of the metal bar 124. The upper end of the metal bar 124 is also designed as a threaded section 150 onto which is screwed a nut 164. The insulation coating 152 surrounds in this case only the upper part of the metal bar 124 as in the remainder sufficient insulation is obtained—especially in respect to the locking piece 142—by means of extensive spacing.

Different from the design version shown in FIG. 1, the mounting piece of the sensor is not in form of a screwed part but rather in form of a flange 180 which has an opening 182 whose diameter is equal to the outside diameter of the moisture resistant tube 136. The moisture resistant tube 136 is led through the opening 182 and extends slightly above the upper side of the flange 180. The moisture resistant tube 136 is rigidly welded and pressure tightly joined to the flange 180. At the upper end of the moisture resistant tube 136 a metal cover 184 is welded which has a central opening through which is passed the metal bar 124. The metal cover 184 serves as support for the stack made up of the sealing ring 156, the ceramic disk 158, the sealing ring 160 and the metal disk 162 which—as in the case of the design shown in FIG. 1—is pressed against the support when the nut 164 is tightened. In this case, this is provided by the metal cover 184.

The flange 180 rests, together with a ring shaped seal 186, on the upper part of a counterflange 188 which is joined to a tubular connection 190 that is welded along the upper side of the container wall 112. The two flanges 180 and 188 are rigidly connected together via the bolts 192.

In the design version shown in FIG. 2, the sensor head 122 is also carried by radiator 168 which is provided with cooling ribs 170, through which passes the extension 174 of the metal bar 124 which serves as electrode connection. The radiator 168, in this case, is joined to the upper side of the flange 180 by means of screws 172.

In respect to moisture protection and heat dissipation the same explanations apply to the version depicted in FIG. 2 as in the case of the design version illustrated in FIG. 1.

It is to be understood that the above detailed description of the various embodiments of the invention is provided by way of example only. Various details of design and construction may be modified without departing from the true spirit and scope of the invention as set forth in the appended claims.

I claim:

1. A sensor for capacitively measuring the level of material in a container, said sensor comrising:

an elongated electrically conductive sensor electrode extending through an opening in a wall of said container into said container, said sensor electrode having a first part and a second part and being connected to mesuring circuitry responding to the capacitance between said sensor electrode and a counter-electrode, which capacitance depends on the level of material in said container;

mounting means for mounting said sensor electrode in an electrically insulating and pressure-tight manner in said container wall opening;

a metallic tubular member connected to said mounting means in a moisture-proof manner and surrounding said first part of said sensor electrode to define a space beween said tubular member and said sensor electrode whereby said tubular member and said sensor electrode are electrically insulated from one another, said tubular member having an inner end remote from said mounting means, said first part of said sensor electrode which is surrounded by said tubular member being inactive for capacitive level measurement;

means for sealing said inner end of said tubular member so as to prevent entry of moisture into said space between said tubular member and said sensor electrode;

said second part of said sensor electrode extending beyond said sealing means and defining an active part of said sensor electrode for capacitive level measurement.

2. A sensor as in claim 1 where said metallic tubular member is in electrical contact with said counter-electrode so that any moisture on the tubular member will not affect a capacity measurement between the sensor electrode and the counter-electrode.

3. A sensor as in claim 2, where said container is electrically conductive and forms said counter-electrode.

4. A sensor as in claim 1, where said container is electrically conductive and forms said counter-electrode.

5. A sensor as in claim 1, where said mounting means comprises a screw member having a bore extending therethrough and an external thread, said opening in the container includes an internal thread, said screw member being threaded into said container opening, said sensor electrode extending through the bore of said screw member, and said tubular member being hermetically connected to the screw member.

6. A sensor as in claim 1, where said mounting means includes a flange member having a circular opening extending therethrough and means for connecting the flange member to the container wall, said tubular member being connected to the flange opening.

7. A sensor as in claim 1, where an abutment member is mounted on a portion of said sensor electrode which extends beyond said sealing means, said sealing means includes sealing members disposed between said abutment member and the inner end of said metallic tubular member, at least one of said sealing members being electrically insulated to provide electrical insulation between said sensor electrode and said metallic tubular member, and tightening means are provided for clamping said sealing members between said abutment member and the inner end of said metallic tubular member.

8. A sensor as in claim 7, where said sealing members include an electrically insulating, tubular member disposed between the metallic tubular member and the abutment member and first and second seals respectively disposed between (a) the metallic and the electrically insulating tubular members and (b) the electrically insulating tubular member and the abutment member.

9. A sensor as in claim 8, where said electrically insulating tubular member is a ceramic tube.

10. A sensor as in claim 7, where said tightening means comprises a portion of said sensor electrode extending from said mounting means out of said container and having an external thread, and a nut threaded onto said external thread to exert a tension on said sensor electrode.

11. A sensor as in claim 1, wherein said sensor electrode comprises two separate metallic members, the first metallic member extending through said mounting means, said metallic tubular member and said sealing means and having a threaded portion extending beyond said sealing means, and the second metallic member having a threaded head adapted to be threaded on the threaded portion of the first metallic member to form the active part of the sensor electrode.

12. A sensor as in claim 1, including a sensor head for containing said circuitry and a radiator with a plurality of fins connecting said sensor head to said mounting means.

13. A sensor as in claim 12, where said radiator is made of cast aluminum.

\* \* \* \* \*